United States Patent [19]

Lakshmanan

[11] 4,133,789

[45] Jan. 9, 1979

[54] ADHESIVE COMPOSITION FOR BONDING A LOW-ENERGY PLASTIC SURFACE TO METAL

[75] Inventor: Pallavoor R. Lakshmanan, Houston, Tex.

[73] Assignee: Gulf Oil Corporation, Pittsburgh, Pa.

[21] Appl. No.: 848,284

[22] Filed: Nov. 3, 1977

[51] Int. Cl.$^2$ .................... C08L 93/00; C09J 1/02; C09J 3/26; C09J 5/00
[52] U.S. Cl. .................... 260/27 EV; 156/60; 156/327; 156/329; 260/29.1 SB; 427/207 A; 428/447
[58] Field of Search ...... 260/27 EV, 27 BB, 29.1 SB; 427/207 A; 156/60, 73.5, 327, 329; 428/447

[56] References Cited

U.S. PATENT DOCUMENTS

| | | | |
|---|---|---|---|
| 2,200,429 | 5/1940 | Perrin et al. | 526/235 |
| 2,490,536 | 12/1949 | Murphy et al. | 260/27 EV |
| 2,703,794 | 3/1955 | Roedel | 260/27 EV |
| 3,175,986 | 3/1965 | Apikos et al. | 260/27 EV |
| 3,192,092 | 6/1965 | Schonhorn | 156/332 |
| 3,542,639 | 11/1970 | Manino | 156/334 |
| 3,622,440 | 11/1971 | Snedeker et al. | 156/334 |
| 3,689,334 | 9/1972 | Dermody | 156/334 |
| 3,798,118 | 3/1974 | Jones | 156/334 |
| 3,971,883 | 7/1976 | Meeks et al. | 156/308 |
| 3,971,884 | 7/1976 | Meeks et al. | 156/308 |

FOREIGN PATENT DOCUMENTS 1167616  10/1969  United Kingdom ............... 260/27 EV

*Primary Examiner*—Ronald W. Griffin

[57] ABSTRACT

An adhesive composition effective in bonding a low-energy plastic surface to metal which provides an improved tensile lap shear strength containing the following components: (1) an ethylene-vinyl ester copolymer; (2) a tackifier selected from the following group: (a) a rosin, (b) a rosin ester, (c) a terpene resin, (d) a terpene phenolic-resin and (e) a rosin-modified phenolic resin; (3) a silane having a structural formula:

$$R(CH_2)_n[NH(CH_2)_3]_mSiX_3$$

wherein R is selected from the group consisting of amino, mercapto, glycidoxypropyl, epoxycyclohexyl, methacryloxy and vinyl; n is an integer from 0 to 6; m, when R is amino, is an integer from 0 to 1; m, when R is selected from the group consisting of mercapto, glycidoxypropyl, epoxycyclohexyl, methacryloxy and vinyl, is the integer 0; and X is selected from the group consisting of Cl, $OCH_3$, $OC_2H_5$ and $OC_2H_4OCH_3$; and (4) a wax and a process for bonding said plastic surface to said metal.

39 Claims, No Drawings

ADHESIVE COMPOSITION FOR BONDING A LOW-ENERGY PLASTIC SURFACE TO METAL

BACKGROUND OF THE INVENTION

1. Field of the Invention

The present invention is useful in bonding a low-energy plastic surface to metal such as, for example, in construction, automotive applications, fabricating, packaging, electrical insulation, and radiation shielding, etc. The adhesive composition described herein is effective in bonding a low-energy plastic surface to metal which provides an improved tensile lap shear strength when compared to the composition without silane containing the following components: (1) an ethylene-vinyl ester copolymer; (2) a tackifier selected from the following group: (a) a rosin, (b) a rosin ester, (c) a terpene resin, (d) a terpene-phenolic resin and (3) a rosin-modified phenolic resin; (3) a silane having the following structural formula:

$$R(CH_2)_n[NH(CH_2)_3]_mSiX_3$$

wherein R is selected from the group consisting of amino, mercapto, glycidoxypropyl, epoxycyclohexyl, methacryloxy and vinyl; n is an integer from 0 to 6; m, when R is amino, is an integer from 0 to 1; m, when R is selected from the group consisting of mercapto, glycidoxypropyl, epoxycyclohexyl, methacryloxy and vinyl, is the integer 0; and X is selected from the group consisting of Cl, $OCH_3$, $OC_2H_5$ and $OC_2H_4OCH_3$; and (4) a wax and a process for bonding said plastic surface to said metal.

2. Description of the Prior Art

Adhesive bonding of a low-energy plastic surface to metal by conventional adhesive bonding techniques, such as bonding polyethylene surfaces, requires some form of surface treatment prior to application of an adhesive to obtain high bond strengths between the surfaces so bonded. A low-energy plastic surface bonded to metal without prior surface treatment of either or both substrates by conventional methods known in the art results in either relatively weak bonds which are inadequate for many purposes such as those requiring strengths in a range in excess of several hundred or thousand pounds per square inch gauge of bonded area or would require the application of heat or pressure to form an effective bond.

Generally, for strong bonds involving a low-energy plastic surface and metal some form of surface treatment or etching of the low-energy plastic surface is required prior to application of an adhesive composition. Surface pretreatment of a low-energy plastic surface typically involves, for example, either acid etching with sulfuric, nitric, chromic acids or mixtures thereof, or flame treatment, corona discharge treatment or treatment with plasma jets or low and high energy radiation, while the metal surface may also require some form of surface preparation such as acid etching or other form of cleaning or surface preparation.

Well known methods in the art for bonding a low-energy plastic surface to metal require surface treatment of the plastic or metal or both prior to bonding in a conventional adhesive process. These methods may further require post-clamping and long post-cure time. In other methods of bonding, heat and pressure are often utilized to exceed the softening point of the low-energy plastic surface, causing the adhesive composition to flow over the metal. In U.S. Pat. No. 3,192,092 a method for bonding a low-energy plastic surface to metal is described wherein adsorption of monomolecular layers of amphiphatic molecules between selected surfaces affords a bond between the surfaces.

Consequently, a need exists for an adhesive composition and much simpler process for bonding a low-energy plastic surface to metal. In accordance with the present invention a novel hot melt adhesive composition is provided which requires minimal heating of surfaces to be bonded and maximum bond strength in a matter of minutes or a few hours without resort to elaborate post-curing procedures. Further, the adhesive composition of the present invention can be applied in its melt form to a low-energy plastic surface and/or a metal in such a manner to provide rapid assembly of plastic surface-to-metal components and immediate handling of the assembled parts.

Applicant is unaware of any prior art relevant to the invention defined and claimed herein.

SUMMARY OF THE INVENTION

I have discovered a unique adhesive composition effective in bonding a low-energy plastic surface to metal which provides an improved tensile lap shear strength which comprises: (1) an ethylenevinyl ester copolymer having from about 9 to about 35 weight percent of a vinyl ester; (2) a tackifier selected from the group consisting of (a) a rosin, (b) a rosin ester, (c) a terpene resin, (d) a terpene-phenolic resin and (e) a rosin-modified phenolic resin; (3) a silane having a structural formula:

$$R(CH_2)_n[NH(CH_2)_3]_mSiX_3$$

wherein R is selected from the group consisting of amino, mercapto, glycidoxypropyl, epoxycyclohexyl, methacryloxy and vinyl; n is an integer from 0 to 6; m, when R is amino, is an integer from 0 to 1; m, when R is selected from the group consisting of mercapto, glycidoxypropyl, epoxycyclohexyl, methacryloxy and vinyl, is the integer 0; and X is selected from the group consisting of Cl, $OCH_3$, $OC_2H_5$ and $OC_2H_4OCH_3$; and (4) a wax.

Further, I have discovered a process for bonding a low-energy plastic surface having a critical surface tension of about 24 to about 37 dynes per centimeter to a metal surface which comprises: (A) heating said low-energy plastic surface to be bonded to a temperature of at least about 50° C. and heating said metal surface to be bonded to a temperature of at least about 130° C., (B) applying an adhesive composition effective in bonding a low-energy plastic surface to metal which provides an improved tensile lap shear strength, said adhesive composition comprising (1) an ethylene-vinyl ester copolymer having from about 9 to about 35 weight percent of vinyl ester; (2) a tackifier selected from the group consisting of (a) a rosin, (b) a rosin ester, (c) a terpene resin, (d) a terpene-phenolic resin and (e) a rosin-modified phenolic resin; (3) a silane having a structural formula:

$$R(CH_2)_n[NH(CH_2)_3]_mSiX_3$$

wherein R is selected from the group consisting of amino, mercapto, glycidoxypropyl, epoxycyclohexyl, methacryloxy and vinyl; n is an integer from 0 to 6; m, when R is amino, is an integer from 0 to 1; m, when R is selected from the group consisting of mercapto, glycidoxypropyl, epoxycyclohexyl, methacryloxy and vinyl, is the integer 0; and X is selected from the group consisting of Cl, OCH₃, OC₂H₅ and OC₂H₄OCH₃; and (4) a wax to at least one of said surfaces and wherein said adhesive composition is in a temperature range of about 140° to about 240° C. at the time of application and then (C) bringing said plastic surface in contact with said metal surface.

DESCRIPTION OF THE INVENTION

The adhesive composition of the present invention contains a specific ethylene-vinyl ester copolymer, a tackifier, a silane and a wax.

Ethylene-Vinyl Ester Copolymer

Ethylene-vinyl ester copolymers that can be used herein include vinyl esters having from 2 to 4 carbon atoms. Examples of suitable ethylene-vinyl ester copolymers are ethylene-vinyl acetate, ethylene-vinyl formate, ethylene-vinyl propionate, ethylene-vinyl butyrate and mixtures thereof. The copolymer can contain from about 9 to about 35 weight percent, preferably about 12 to about 25 weight percent, of a vinyl ester, and can have a melt index as measured by ASTM 1238-52T of about 0.5 to about 200, preferably 2.0 to about 100. These copolymers can be prepared by any method generally employed in the art, for example, a preparation such as that taught in U.S. Pat. Nos. 2,200,429 to Perrin et al. and 2,703,794 to Roedel. In the present invention blends, or mixtures, of ethylene-vinyl ester copolymers are sometimes used to obtain a melt index within the desired range. For example, if blends or mixtures of ethylene-vinyl ester copolymers are employed, individual ethylene-vinyl ester copolymers can be used even if they do not have the melt index defined above, provided the resulting mixture has a melt index within the defined range.

Tackifiers

As contemplated in the present invention suitable tackifiers can be selected from the group consisting of (a) a rosin, (b) a rosin ester, (c) a terpene resin, (d) a terpene-phenolic resin and (e) a rosin-modified phenolic resin. Tackifiers which are present in the adhesive composition serve to extend the adhesive properties of the ethylene-vinyl ester copolymer. Tackifiers for use in the present invention have a softening point in the range of about 40 to about 150° C., preferably about 65 to about 135° C. Small amounts of tackifiers having a softening point of less than 40° C. or higher than 150° C. can be mixed or blended with tackifiers in the desired range to give desirable results; however, tackifiers having softening points of less than 40° C. or higher than 150° C. are not preferred in the invention as set forth. Examples of rosins and rosin esters in the hot melt system include both natural and modified rosins, such as, for example, gum rosin, wood rosin, tall oil rosin, distilled rosin, hydrogenated rosin, dimerized rosin, disproportionated rosin and polymerized rosin; glycerine and pentaerythritol esters of rosin including stabilized, hydrogenated, disproportionated, dimerized and unmodified rosin. Terpene resins, sometimes called polyterpene resins, result from the polymerization of terpene hydrocarbons, such as bicyclic monoterpene known as pinene, in the presence of a Friedel-Crafts catalyst at moderately low temperatures. Terpene resins have a softening point as measured by ASTM E28-58T of from about 40 to about 150° C. Other examples of suitable terpene resins can include polymerized beta-pinene. Terpene-phenolic resins can include, for example, the product resulting from the condensation of bicyclic terpene, in an acidic medium and/or terpene alcohol with phenol. Rosin-modified phenolic resins can include, for example, the reaction products of rosin with phenol-formaldehyde condensate. Rosin and rosin esters can be prepared, for example, according to the methods described in the *Encyclopedia of Polymer Science and Technology*, Interscience Publishers, a Division of John Wiley & Sons (New York: 1974), Volume 12, pp. 139-164; terpene resins can be prepared, for example, according to the methods described in Volume 13, pp. 575-596 of the same publication. Terpene-phenolic resins and rosin-modified phenolic resins can be prepared, for example, according to the methods described in *Organic Coating Technology*, H. F. Payne, John Wiley & Sons (New York: 1954), Volume 1, pp. 183-184 and 168-170, respectively.

Silanes

Silanes which can be employed herein are represented by the following structural formula:

$$R(CH_2)_n[NH(CH_2)_3]_mSiX_3$$

wherein R is selected from the group consisting of amino, mercapto, glycidoxypropyl, epoxycyclohexyl, methacryloxy and vinyl; n is an integer from 0 to 6, preferably from 0 to 3; m, when R is amino, is an integer from 0 to 1, preferably 0; m, when R is selected from the group consisting of mercapto, glycidoxypropyl, epoxycyclohexyl, methacryloxy and vinyl, is the integer 0; and X is selected from the group consisting of Cl, OCH₃, OC₂H₅, and OC₂H₄OCH₃. When R is amino R contains no carbon atoms; when R is mercapto, R contains no carbon atoms; when R is glycidoxypropyl, R contains 3 carbon atoms; when R is epoxycyclohexyl, R contains 6 carbon atoms; when R is methacryloxy, R contains 4 carbon atoms; and and when R is vinyl, R contains 2 carbon atoms. Especially preferred silanes for use in the present invention are gamma-aminopropyltriethoxysilane: NH₂(CH₂)₃Si(OC₂H₅)₃; N-beta-(aminoethyl)-gamma-aminopropyltrimethoxysilane: NH₂(CH₂)₂NH(CH₂)₃Si(OCH₃)₃; and gamma-mercaptopropyltrimethoxysilane: HS(CH₂)₃Si(OCH₃)₃.

Wax

The fourth component of the claimed adhesive composition is a wax. Any suitable wax, natural or synthetic, can be employed. These can include, for example, paraffinic wax, scale wax, ozokerite, Utah wax, microcrystalline wax such as plastic and tank bottom derived microcrystalline waxes, synthetic wax such as Fisher-Tropsch wax, polyethylene, both low and high density polyethylenes, atactic polypropylene, and blends and copolymers thereof. The preferred waxes can include petroleum-derived waxes such as, for example, microcrystalline waxes and paraffin waxes; intermediate waxes which are hybrid materials derived from heavy waxy distillates and having physical and functional properties intermediate to those of fully refined paraffin waxes and microcrystalline waxes; and polyethylene. Microcrystalline waxes can include, for example, branched-chain hydrocarbons and alkylcycloaliphatic (naphthenic hydrocarbons) as well as straight-chain hydrocarbons whose molecular weight range is from about 400 to about 800, as defined, for example, in the *Encyclopedia of Polymer Science and Technology,* Interscience Publishers, a Division of John Wiley, (New York, 1971) Vol. 14, pp. 770-771. Intermediate waxes are characterized by a melting point of about 150 to about 160° F. (65.5° C. to about 71.1° C.) as measured by ASTM-D87; a viscosity, SUS at 210° F. of about 51.7; and a molecular weight of about 500 to about 650. Suitable polyethylene in the present invention have an average molecular weight of about 600 to about 40,000, preferably about 600 to about 3000, and most preferably about 900 to about 2500. Polyethylenes useful as waxes in the present invention can be linear or branched preferably linear, that is, at least 70 percent of the molecules are linear or paraffinic; preferably at least 90 percent are linear. The n-paraffin or n-alkane content of hydrocarbon waxes can be determined by molecular sieve adsorption or by urea adduction. The penetration or hardness of the wax at 25° C. is about 0.25 to about 1.5, preferably about 0.75 to about 1.00 as determined by ASTM-D 1321. The density at 25° C. of the polyethylene wax employed in the present invention is about 0.93 to about 0.97, preferably about 0.94 to about 0.96. Each of the enumerated parameters are interrelated as is readily apparent to one of ordinary skill in the art. Polyethylene waxes can be obtained, for example, by the low pressure polymerization of ethylene using Ziegler catalysts.

If desired, other components generally added to an adhesive composition for a particular purpose can also be present in an amount of about 0.1 to about 5, preferably 0.2 to about 2, weight percent based on the weight of the final composition. An example of such an additive can include an antioxidant such as butylated hydroxy toluene.

For purposes of the present invention a low-energy plastic surface is defined as one which has a critical surface tension ($\gamma c$) of between about 24 to about 37 dynes/cm (mN/m), for example, polyethylene ranges from about 25.5 to about 36 dynes/cm, and polypropylene ranges from about 24 to about 34 dynes/cm.

Any metal can be used in the present invention but those which are preferred are those which have industrial uses such as automotive, electrical and radiation applications. Among these metals are included, for example, lead, copper, bronze, steel, stainless steel and aluminum, and metal blends and/or alloys containing one or more of these enumerated metals.

In general, the adhesive composition can have the composition on a weight percentage basis as set forth in Table 1.

Table 1

| Adhesive Composition | | |
|---|---|---|
| | Broad Range, wt % | Preferred Range, wt % |
| Ethylene Vinyl Ester Copolymer | 20-55 | 25-52 |
| Tackifier | 25-40 | 25-40 |
| Silane | 0.25-5 | 1-3 |
| Wax | 5-54.75 | 5-49 |

The adhesive composition can be prepared in any conventional manner. Thus, for example, a preferred procedure involves the use of a so-called melt mixing technique in which the wax (diluent) together with an antioxidant, if used, is maintained in a stirred molten state at a temperature between about 130 to about 230° C., preferably between about 140 to 170° C., during which time the tackifier is added followed by the addition of the ethylene-vinyl ester copolymer. Mixing is continued until a homogeneous mixture is obtained at which point the temperature is lowered to about 138 to about 144° C., preferably about 130 to about 137° C. and the requisite amount of the silane is added and mixed at the stated temperature for about 10 to about 15 minutes. Generally, the total time for mixing an adhesive composition is from about 20 minutes to about 4 hours.

The adhesive composition of the present invention is used to bond a low-energy plastic surface having a critical surface tension of about 24 to about 37 dynes per centimeter to metal surfaces. The process involves heating said low-energy plastic surface which is to be bonded to said metal surface to a temperature of at least about 50° C., preferably about 60 to about 130° C., and said metal surface to about 130 to about 170° C., preferably about 150 to about 170° C.; followed by an application of the adhesive composition of the present invention while the adhesive is at a temperature within the range of about 140 to about 240° C., preferably about 160 to about 220° C., to the low-energy surface. Then the coated surface is brought in contact with the other. After assembly the bond reaches maximum strength in a matter of minutes or few hours. No post-curing is required and, therefore, rapid assembly and handling of assembled parts is possible.

DESCRIPTION OF PREFERRED EMBODIMENTS

The invention will be further described with reference to the experimental data.

The adhesive compositions in the present invention were prepared as follows. A wax, in an amount sufficient to make a 201-to-208 gram batch of adhesive, was mixed with an antioxidant, butylated hydroxy toluene. The wax-antioxidant mixture was placed in a jacketed 400-ml capacity Brabender Plasticorder and kept hot by an oil bath heated to approximately 145 to about 155° C. At a slow, 50-rpm blade setting, the wax-antioxidant mixture was melted and then the tackifier was added while mixing continued. Continued mixing produced a fluid wax-antioxidant-tackifier mixture. An ethylene-vinyl ester copolymer was added to the fluid-wax-antioxidant-tackifier mixture in the order of high melt index copolymer followed by low melt index copolymer. Mixing was continued at a top speed setting of the blades at approximately 150 rpm for approximately 10 to about 15 minutes until homogeneity occurred, and then the speed was decreased to 100 rpm and composition was mixed for approximately 5 minutes. The mixture was cooled from about 150° C. to about 134° C. over a period of about 15 to about 20 minutes, at which point the silane was added and mixing continued at the indicated temperature for about 10 minutes. On completion of mixing, after the torque generally leveled-off, the adhesive composition was ready to be poured. Total mixing time was about 20 to about 30 minutes.

Low-energy plastic and metal test specimens were prepared in accordance with the following procedure. Test strips having a dimension of 1 × 3 × ⅛ in. (2.54 × 7.5 × 0.31 cm) or 1 × 3 × 3/16 in. (2.54 × 7.5 × 0.476 cm) were used in the preparation of tensile lap shear strength test specimens. The strips were cleaned with an acetone rinse and wiped dry. The test strips (two for each test specimen), one plastic and the other metal, were then exposed to an infrared lamp to heat the plastic surface to between about 90 to about 110° C. and the metal surface between about 130 to about 150° C. Molten adhesive at temperatures between about 176 to about 220° C. was applied as a ⅛-inch (0.31 cm) bead over a square inch (6.45 cm²) area on the plastic test strips. A lap shear strength specimen was prepared immediately following application of the adhesive composition by quickly placing the metal strip over the adhesive with the heated side of the strip on the adhesive to provide a square inch (6.45 cm²) lap. Manual pressure was used to spread the adhesive over a bonded area. A 500-gram weight was placed on the bonded area and left for about 5 minutes to maintain contact of the surfaces during the initial cooling of the adhesive after which the weight was removed. The specimen was cooled to 23° C. and excess adhesive was removed. The specimen was stored overnight prior to testing. At least two specimens were prepared for each evaluation and the values reported as an average of the two for a test run.

The method used for testing the adhesive bond strength was the tensile lap shear method with modifications as described in U.S. Pat. No. 3,393,174 at columns 2 through 3. The values for lap shear were measured by determining on an Instron the force required to break the bond. As a modification employed herein, the rate of extension was 2 inches (5 cm) per minute.

The force divided by the area of the bond gives the lap shear in pounds per square inch.

A series of runs was carried out using the adhesive compositions set forth in the upper portion of Table 2 to demonstrate improved tensile lap shear strength. It can be seen that the addition of silane to Run Nos. 2 (containing a polyethylene wax), 4 (containing a microcrystalline wax), and 6 (containing an intermediate wax) resulted in improved tensile lap shear strength when each of the above runs were compared to Run Nos. 1, 3 and 5, respectively.

Additionally, Run No. 6, a silane-containing composition, demonstrates not only improved tensile lap shear strengh when polyethylene or polypropylene is bonded to steel, but also demonstrates improved tensile lap shear strength when polypropylene is bonded to aluminum.

Table 2

| Run No. | 1 | 2 | 3 | 4 | 5 | 6 |
|---|---|---|---|---|---|---|
| Composition, parts by weight[1] | | | | | | |
| Ethylene-Vinyl Acetate Copolymer A,[2] 18% vinyl acetate; melt index 500 | 10 | 10 | 10 | 10 | 10 | 10 |
| Ethylene-Vinyl Acetate Copolymer B,[3] 18% vinyl acetate; melt index 2.5 | 30 | 30 | 30 | 30 | 30 | 30 |
| Glycerine Ester of Highly Hydrogenated Rosin[4], softening point 83° C | 40 | 40 | 40 | 40 | 40 | 40 |
| Polyethylene wax[5] | 20 | 20 | — | — | — | — |
| Microcrystalline wax[6] | — | — | 20 | 20 | — | — |
| Intermediate Wax[7] | — | — | — | — | 20 | 20 |
| γ-Aminopropyltriethoxysilane[8] | — | 1.5 | — | 1.5 | — | 1.5 |
| Inspections | | | | | | |
| Viscosity, Mcps at 350° F (176.6° C)[9] | 22.0 | 73.0 | 19.2 | 33.0 | 11.6 | 50.0 |
| Tensile Lap Shear, psi (kg/cm²) | | | | | | |
| High Density Polyethylene[10] to steel[11] | 619 (43.5) | 825 (58) | 373 (26.2) | 688 (48.4) | 238 (16.7) | 730 (51.33) |
| Polypropylene[12] to steel[11] | 545 (38.2)[13] | 670 (47.2)[13] | 415 (29.2) | 526 (37.0) | 236 (16.5) | 570 (40.1) |
| Polypropylene to aluminum[11] | — | — | — | — | 158 (11.11) | 328 (23.06) |

[1]Optional antioxidant, for example, 0.5 parts by weight butylated hydroxy toluene was used in all experiments herein.
[2]Elvax 410 from E. I. DuPont.
[3] Elvax 460 from E. I. DuPont.
[4]Foral 85 from Hercules, Inc.
[5]Vebawax 616 from Veba-Chemie.
[6]Multiwax 180M, Witco Chemicals.
[7]Gulfwax 55 from Gulf Oil Corp.
[8]Silane A-1100 from Union Carbide.
[9]Mcps at 350° F = number × 1000.
[10]Thickness 0.189 in. (0.48 cm).
[11]Thickness 0.033 in. (0.083 cm).
[12]Thickness 0.130 in. (0.33 cm).
[13]Denotes substrate failure.

A series of runs was carried out using the adhesive compositions set forth in the upper portion of Table 3 to demonstrate improved tensile lap shear strength with the addition of a silane to an adhesive composition containing an ethylene-vinyl ester copolymer, a terpene-phenolic resin and a wax. Run No. 8 (containing a microcrystalline wax) and Run No. 10 (containing an intermediate wax) show improvement in tensile lap shear strength.

Table 3

| Run No. | 7 | 8 | 9 | 10 |
|---|---|---|---|---|
| Composition, parts by weight[1] | | | | |
| Ethylene-Vinyl Acetate Copolymer[2] 18% Vinyl Acetate; melt index 8.8 | 40 | 40 | 40 | 40 |
| Terpene-Phenolic Resin,[3] softening point 100° C | 40 | 40 | — | — |
| Terpene-Phenolic Resin,[4] softening point 122° C | — | — | 40 | 40 |
| Microcrystalline Wax[5] melting point 82.2° C | 20 | 20 | — | — |
| Intermediate Wax[6] melting point 68.3° C | — | — | 20 | 20 |
| γ-Aminopropyltriethoxysilane | — | 1.5 | — | 1.5 |
| Inspections | | | | |
| Viscosity, Mcps at 350° F (176.6° C) | 18.7 | 27.0 | 16.5 | 28.2 |
| Tensile Lap Shear, psi (kg/cm²) | | | | |

Table 3-continued

| Run No. | 7 | 8 | 9 | 10 |
|---|---|---|---|---|
| Polypropylene[5] to steel[6] | 646 (45.42)[7] | 695 (48.87)[7] | 548 (38.5) | 705 (49.57) |

[1]See Table 2, footnote #1.
[2]A 1:3 blend of Elvax 410 to Elvax 460, respectively, from E. I. DuPont.
[3]Piccofyn A-100 from Hercules, Inc.
[4]Nirez 2019 from Reichhold Chemicals.
[5]Thickness 0.130 in. (0.33 cm).
[6]Thickness 0.033 in. (0.083 cm).
[7]See Table 2, footnote #13.

A series of runs was carried out using adhesive compositions set forth in the upper portion of Table 4 to demonstrate improved tensile lap shear strength with the addition of a silane to an adhesive composition employing a different ethylene-vinyl ester copolymer. Run Nos. 12 and 14 have improved tensile lap shear strength.

Table 4

| Run No. | 11 | 12 | 13 | 14 |
|---|---|---|---|---|
| Composition, parts by weight[1] | | | | |
| Ethylene-Vinyl Acetate Copolymer[2] 12% vinyl acetate; melt index 8 | 40 | 40 | 40 | 40 |
| Glycerine Ester of Highly Hydrogenated Rosin, softening point 83° C | 40 | 40 | 40 | 40 |
| Polyethylene Wax melting point 120.5° C | 20 | 20 | — | — |
| Intermediate Wax melting point 68.3° C | — | — | 20 | 20 |
| γ-Aminopropyltriethoxysilane | — | 1.5 | — | 1.5 |
| Inspections | | | | |
| Viscosity, Mcps at 350° F (176,6° C) | 19.2 | 51.5 | 8.6 | 21.6 |
| Tensile Lap Shear, psi (kg/cm²) Polypropylene[3] to steel[4] | 78.5 (5.5) | 315 (22.15) | poor, <10 (<0.7) | 342 (24.08)[5] |

[1]See Table 2, footnote #1.
[2]Ethylene Copolymer 3134 from E. I. DuPont.
[3]Thickness 0.130 in. (0.33 cm).
[4]Thickness 0.33 in. (0.083 cm).
[5]See Table 2, footnote #13.

A series of runs was carried out using adhesive compositions set forth in the upper portion of Table 5 to demonstrate improved tensile lap shear strength with the addition of a silane to an adhesive composition employing still another ethylene-vinyl ester copolymer. Run Nos. 16 and 18 have improved tensile lap shear strength.

Table 5

| Run No. | 15 | 16 | 17 | 18 |
|---|---|---|---|---|
| Composition, parts by weight[1] | | | | |
| Ethylene Vinyl Acetate Copolymer,[2] 25% vinyl acetate, melt index 7.72 | 40 | 40 | — | — |
| Ethylene Vinyl Acetate Copolymer,[3] 28% vinyl acetate, melt index 8.9 | — | — | 40 | 40 |
| Glycerine Ester of Highly Hydrogenated Rosin, softening point 83° C | 40 | 40 | 40 | 40 |
| Polyethylene Wax, melting point 120.5° C | 20 | 20 | 20 | 20 |
| γ-Aminopropyltriethoxysilane | 0 | 1.5 | 0 | 1.5 |
| Inspections | | | | |
| Viscosity, Mcps at 350° F (176,6° C) | 1940 | — | 18.7 | — |
| Tensile Lap Shear, psi (kg/cm²) Polypropylene to steel | 395 (27.77) | 540 (40) | 354 (24.3) | 536 (37.69) |

[1]See Table 2, footnote #1.
[2]A 1:3 blend of Elvax 310 to Elvax 360, respectively, from E. I. DuPont.
[3]A 1:3 blend of Elvax 210 to Elvax 265, respectively, from E. I. DuPont.

Two runs were carried out using the adhesive composition set forth in the upper portion of Table 6 to demonstrate improved tensile lap shear strength with the addition of a silane to an adhesive composition containing an ethylene-vinyl ester copolymer, a terpene resin, and a polyethylene wax. Run No. 20 has improved tensile lap shear strength.

Table 6

| Run. No. | 19 | 20 |
|---|---|---|
| Composition, parts by weight[1] | | |
| Ethylene-Vinyl Acetate Copolymer, 18% vinyl acetate, melt index 8.8 | 40 | 40 |
| Terpene Resin,[2] softening point 115° C | 40 | 40 |
| Polyethylene Wax, melting point 120.5° C | 20 | 20 |
| γ-Aminopropyltriethoxysilane | — | 1.5 |
| Inspections | | |
| Viscosity, Mcps at 350° F (176,6° C) | 21.8 | 38.2 |
| Tensile Lap Shear, psi (kg/cm²) Polypropylene to steel | 220 (15.5) | 607 (42.68)[3] |

[1]See Table 2, footnote #1
[2]Nirez 1115 from Reichhold Chemicals.
[3]See Table 2, footnote #13.

Two runs were carried out using the adhesive composition set forth in the upper portion of Table 7 to demonstrate the effect of varying the amount of silane on adhesive composition. Run Nos. 21 and 22 exhibited the desired improved tensile lap shear strength.

Table 7

| Effect of Varying the Amount of Silane | | |
|---|---|---|
| Run No. | 21 | 22 |
| Composition, parts by weight[1] | | |
| Ethylene-Vinyl Acetate Copolymer, 18% vinyl acetate; melt index 8.8 | 40 | 40 |
| Glycerine Ester of Highly Stabilized Rosin, softening point 83° C | 40 | 40 |
| Intermediate Wax, melting point 82.2° C | 20 | 20 |
| γ-Aminopropyltriethoxysilane | 2.5 | 3.5 |
| Inspection | | |
| Viscosity, Mcps at 350° F (176.6° C) | 82.5 | 80.5 |
| Tensile Lap Shear, psi (kg/cm$^2$) Polypropylene to steel | 558 (39.24) | >556 (>39.8) |

[1]See Table 2, footnote #1.

Runs were carried out using other aminosilanes and mercaptosilanes to demonstrate their applicability in the present invention. The results of Run Nos. 23 through 25 are set forth in Table 8. Both Run Nos. 24 and 25 showed improved tensile lap shear strengths.

Table 8

| Effect of Various Silanes in Adhesive Composition | | | |
|---|---|---|---|
| Run No. | 23 | 24 | 25 |
| Composition, parts by weight[1] | | | |
| Ethylene-Vinyl Acetate Copolymer, 18% vinyl acetate; melt index 8.8 | 40 | 40 | 40 |
| Glycerine Ester of Highly Hydrogenated Rosin softening point 83° C | 40 | 40 | — |
| Terpene-Phenolic Resin softening point 122° C | — | — | 40 |
| Intermediate Wax melting point 68.3° C | 20 | 20 | — |
| Microcrystalline Wax melting point 82.2° C | — | — | 20 |
| γ-Mercaptopropyltrimethoxysilane | — | 1.5 | — |
| N-B(aminoethyl)-gamma-aminopropyltrimethoxysilane | — | — | 0.75 |
| Inspections | | | |
| Viscosity, Mcps at 350° F (176.6° C) | 11.6 | 12.7 | 106 |
| Tensile Lap Shear, psi (kg/cm$^2$) Polypropylene to steel | 236 (16.5) | >545 | 547 (38.46) |

[1]See Table 2, footnote #1.

Obviously, many modifications and variations of the invention, as set forth herein, can be made without departing from the spirit and scope thereof, and therefore only such limitations should be imposed as are indicated in the appended claims.

I claim:

1. An adhesive composition effective in bonding a low-energy plastic surface to metal which provides an improved tensile lap shear strength consisting essentially of: (1) about 20 to about 55 weight percent of an ethylene-vinyl ester copolymer having from about 9 to about 35 weight percent of a vinyl ester, said vinyl ester having 2 to 4 carbon atoms; (2) about 25 to about 40 weight percent of a tackifier selected from the group consisting of (a) a rosin, (b) a rosin ester, (c) a terpene resin, (d) a terpene-phenolic resin and (e) a rosin-modified phenolic resin; (3) about 0.25 to about 5 weight percent of a silane having a structural formula:

$$R(CH_2)_n[NH(CH_2)_3]_m SiX_3$$

wherein R is selected from the group consisting of amino, mercapto, glycicoxylpropyl, epoxycyclohexyl, methacryloxy and vinyl; n is an integer from 0 to 6; m, when R is amino, is an integer from 0 to 1; m, when R is selected from the group consisting of mercapto, glycidoxylpropyl, epoxycyclohexyl, methacryloxy and vinyl is the integer 0; and X is selected from the group consisting of Cl, $OCH_3$, $OC_2H_5$ and $OC_2H_4OCH_3$; and (4) about 5 to about 54.75 weight percent of a wax.

2. An adhesive composition according to claim 1, wherein said ethylene-vinyl ester copolymer is selected from the group consisting of ethylene-vinyl acetate, ethylene-vinyl formate, ethylene-vinyl propionate, ethylene-vinyl butyrate and mixtures thereof.

3. An adhesive composition according to claim 1, wherein said copolymer contains from about 12 to about 25 weight percent of a vinyl ester.

4. An adhesive composition according to claim 1, wherein said copolymer has a melt index of about 0.5 to about 200 as measured by ASTM-1238-52T.

5. An adhesive composition according to claim 1, wherein said copolymer has a melt index of about 2.0 to about 100.

6. An adhesive composition according to claim 1, wherein said tackifier has a softening point of about 40 to about 150° C.

7. An adhesive composition according to claim 1, wherein said tackifier has a softening point of about 65 to about 135° C.

8. An adhesive composition according to claim 1, wherein said tackifier is a rosin.

9. An adhesive composition according to claim 8, wherein said rosin is a hydrogenated rosin.

10. An adhesive composition according to claim 1, wherein said tackifier is a rosin ester.

11. An adhesive composition according to claim 10, wherein said rosin ester is a glycerine ester of hydrogenated rosin.

12. An adhesive composition according to claim 1, wherein said tackifier is a terpene resin.

13. An adhesive composition according to claim 12, wherein said terpene resin is a polyterpene.

14. An adhesive composition according to claim 1, wherein said tackifier is a terpene-phenolic resin.

15. An adhesive composition according to claim 1, wherein said tackifier is a rosin-modified phenolic resin.

16. An adhesive composition according to claim 1, wherein R in said silane is amino.

17. An adhesive composition according to claim 1, wherein R in said silane is mercapto.

18. An adhesive composition according to claim 1, wherein R in said silane is glycidoxypropyl.

19. An adhesive composition according to claim 1, wherein R in said silane is epoxycyclohexyl.

20. An adhesive composition according to claim 1, wherein R in said silane is methacryloxy.

21. An adhesive composition according to claim 1, wherein R in said silane is vinyl.

22. An adhesive composition according to claim 1, wherein n in said silane is an integer from 0 to 3.

23. An adhesive composition according to claim 1, wherein X in said silane is Cl.

24. An adhesive composition according to claim 1, wherein X in said silane is $OCH_3$.

25. An adhesive composition according to claim 1, wherein X in said silane is $OC_2H_5$.

26. An adhesive composition according to claim 1, wherein X in said silane is $OC_2H_4OCH_3$.

27. An adhesive composition according to claim 1, wherein said silane is gamma-mercaptopropyltrimethoxysilane.

28. An adhesive composition according to claim 1, wherein said silane is beta-(3,4-epoxycyclohexyl)-ethyltrimethoxysilane.

29. An adhesive composition according to claim 1, wherein said silane is gamma-aminopropyltriethoxysilane.

30. An adhesive composition according to claim 1, wherein said silane is N-beta-(aminoethyl)-gamma-aminopropyltrimethoxy silane.

31. An adhesive composition according to claim 1, wherein said wax is a microcrystalline wax.

32. An adhesive composition according to claim 1, wherein said wax is an intermediate wax.

33. An adhesive composition according to claim 1, wherein said wax is a polyethylene.

34. An adhesive composition according to claim 1, wherein said wax is atactic polypropylene.

35. An adhesive composition according to claim 1, wherein said ethylene-vinyl ester copolymer is about 25 to about 52 weight percent; said tackifier is about 25 to about 40 weight percent; said silane is about 1 to about 3 weight percent and said wax is about 5 to about 49 weight percent of the total composition.

36. A process for bonding a low-energy plastic surface having a critical surface tension of about 24 to about 37 dynes per centimeter to a metal surface which comprises: (A) heating said low-energy plastic surface that will be bonded to a temperature of at least about 50° C. and heating said metal surface to a temperature of at least about 130° C., (B) applying an adhesive composition effective in bonding a low-energy plastic surface to metal which provides an improved tensile lap shear strength, said adhesive composition consisting essentially of: (1) about 20 to about 55 weight percent of an ethylene-vinyl ester copolymer having from about 9 to about 35 weight percent of a vinyl ester, said vinyl ester having 2 to 4 carbon atoms; (2) about 25 to about 40 weight percent of a tackifier selected from the group consisting of at least one of (a) a rosin, (b) a rosin ester, (c) a terpene resin, (d) a terpene-phenolic resin and (e) a rosin-modified phenolic resin; (3) about 0.25 to about 5 weight percent of a silane having a structural formula:

$$R(CH_2)_n[NH(CH_2)_3]_mSiX_3$$

wherein R is selected from the group consisting of amino, mercapto, glycidoxylpropyl, epoxycyclohexyl, methacryloxy and vinyl; n is an integer from 0 to 6; m, when R is amino, is an integer from 0 to 1; m, when R is selected from the group consisting of mercapto, glycidoxypropyl, epoxycyclohexyl, methacryloxy and vinyl, is the integer 0; and X is selected from the group consisting of Cl, $OCH_3$, $OC_2H_5$ and $OC_2H_4OCH_3$ and (4) about 5 to about 54.75 weight percent of a wax to at least one of said surfaces and wherein said adhesive composition is at a temperature within the range of about 140 to about 240° C. at the time of application and then (c) bringing said surfaces in contact with each other.

37. A process according to claim 36 wherein said heating of said low-energy plastic surface is to a temperature of about 60 to about 130° C.; said heating of said metal surface is to a temperature of about 130 to about 170° C.; and wherein said adhesive composition is at a temperature within the range of about 160 to about 220° C.

38. A process according to claim 36 wherein said low-energy plastic surface is polyethylene.

39. A process according to claim 36 wherein said low-energy plastic surface is polypropylene.

* * * * *